Feb. 23, 1943.　　M. J. KONETSKY　　2,312,253
REAR UNDERCONSTRUCTION FOR VEHICLES
Filed June 8, 1940　　4 Sheets-Sheet 4
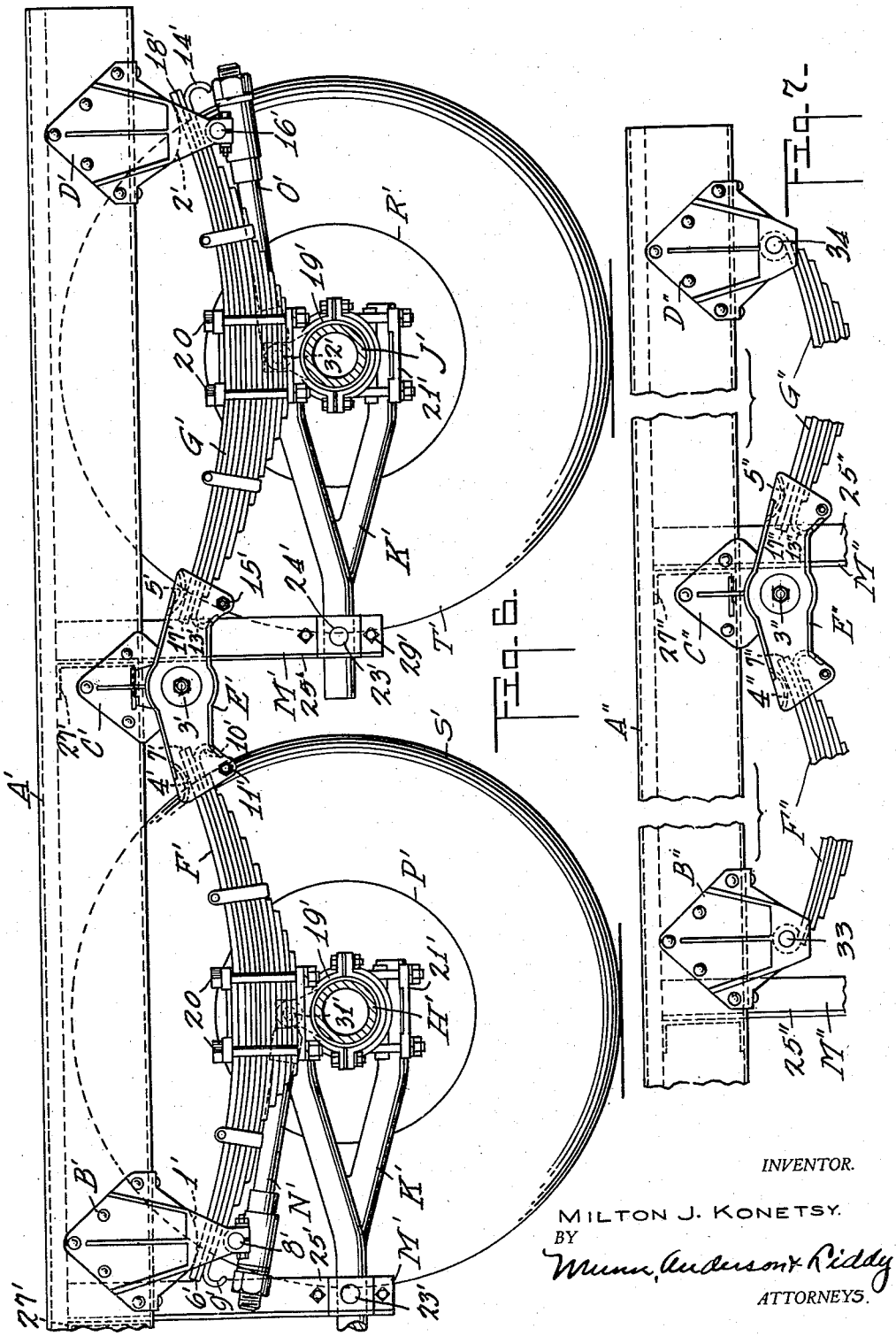
INVENTOR.
MILTON J. KONETSY.
BY
ATTORNEYS.

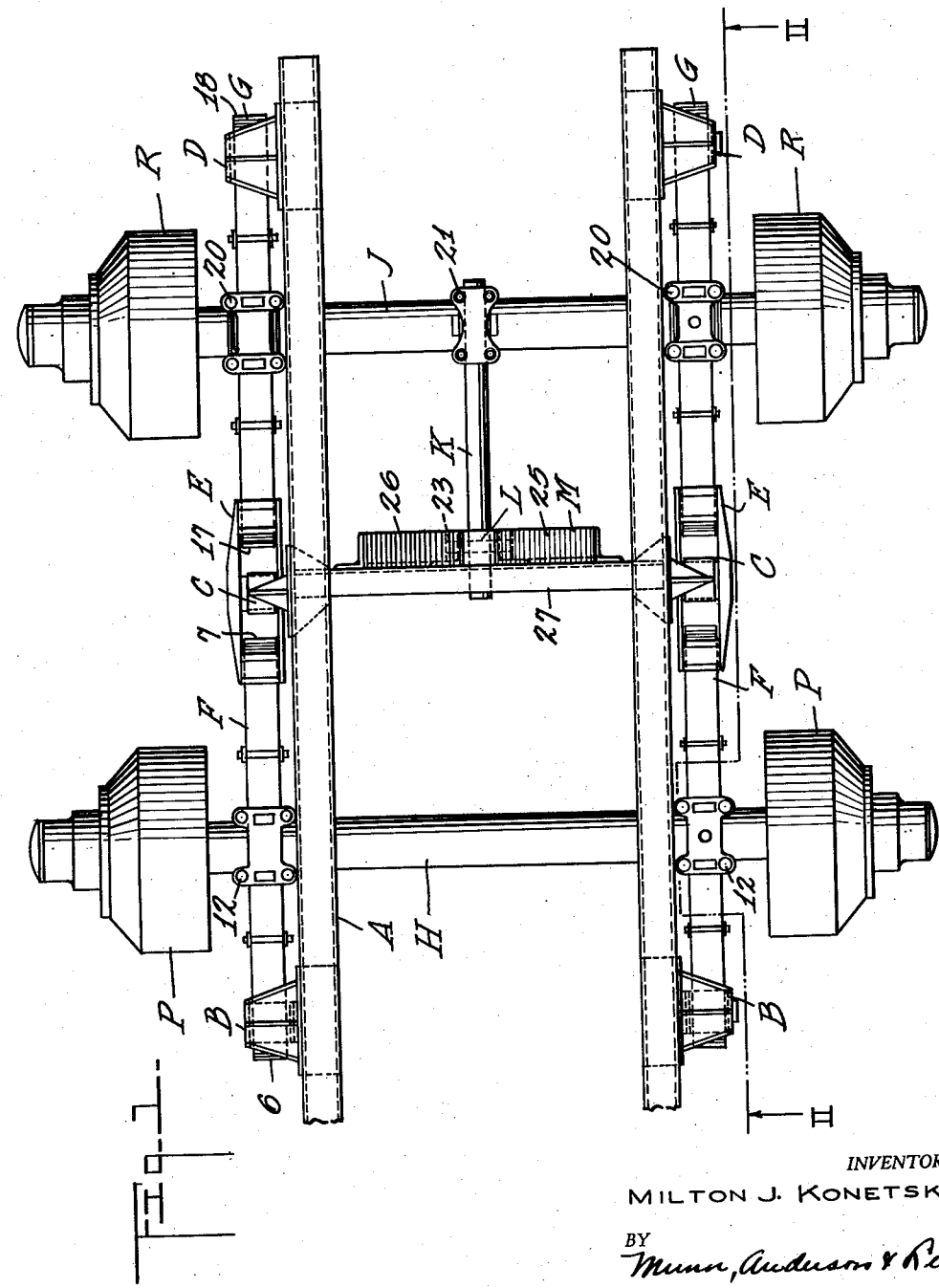

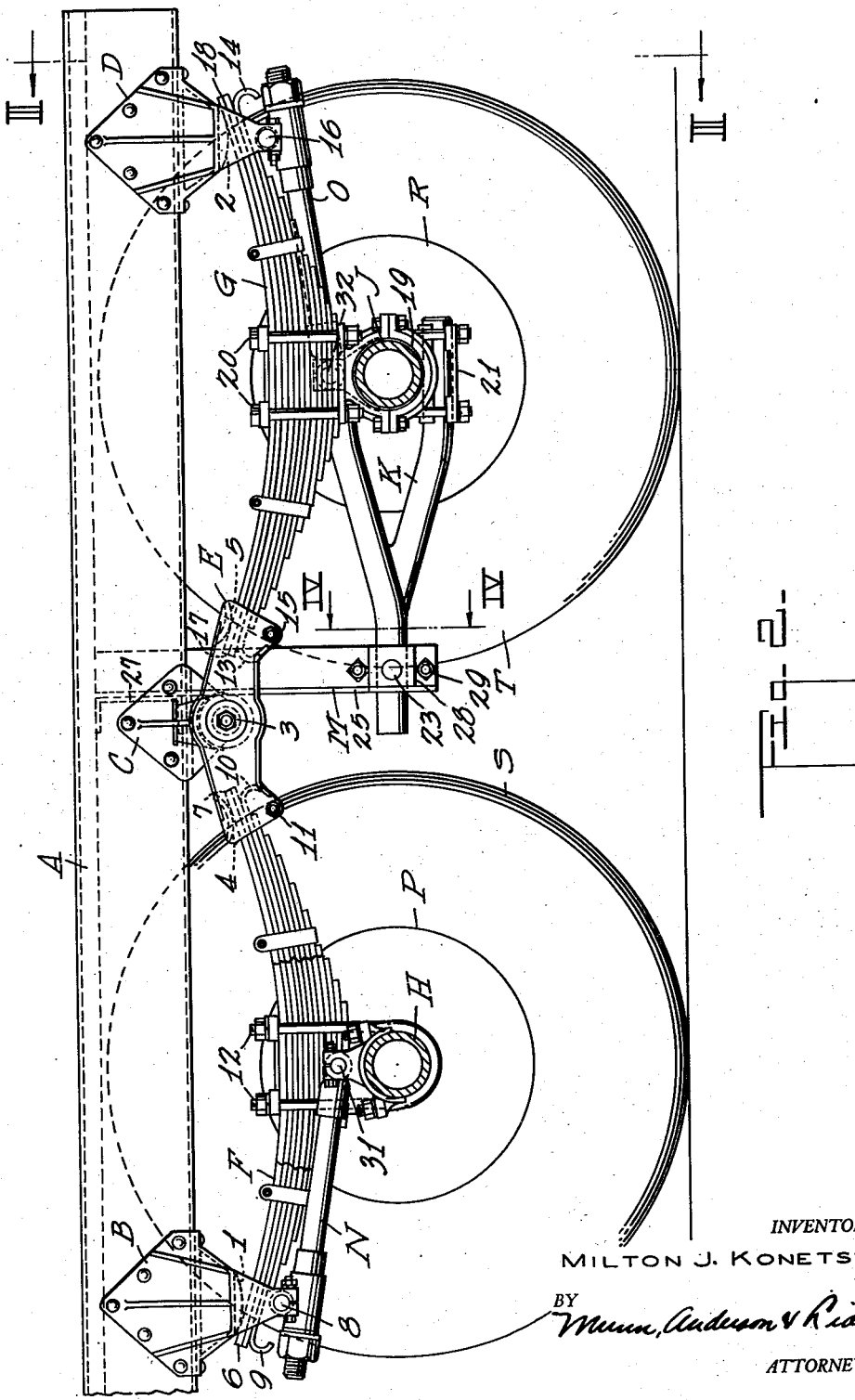

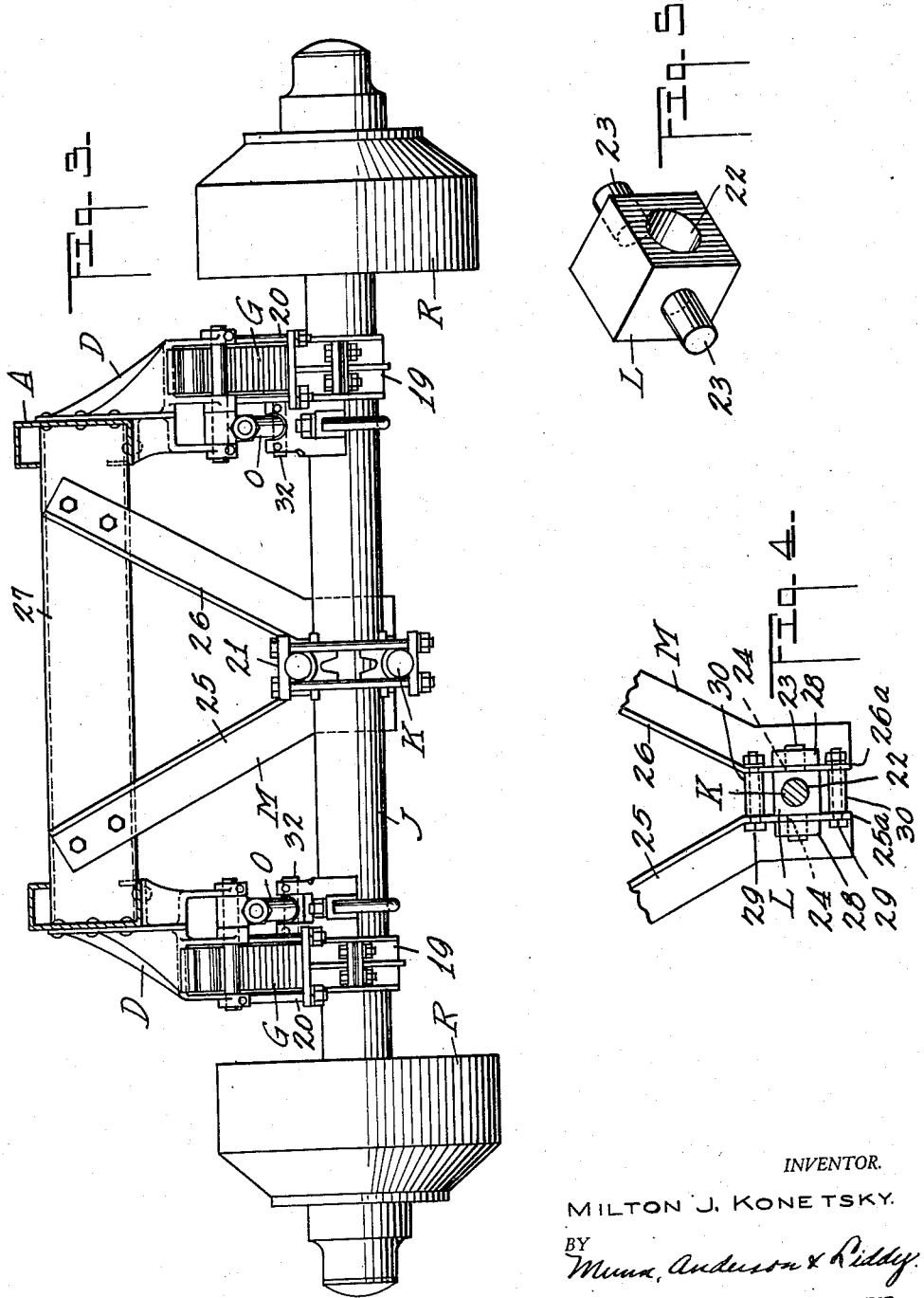

Patented Feb. 23, 1943

2,312,253

UNITED STATES PATENT OFFICE 2,312,253

REAR UNDERCONSTRUCTION FOR VEHICLES

Milton J. Konetsky, San Francisco, Calif.

Application June 8, 1940, Serial No. 339,520

1 Claim. (Cl. 280—124)

The present invention relates to improvements in a rear underconstruction for vehicles, and it consists of the combinations, constructions and arrangements hereinafter described and claimed.

An object of my invention is to provide a rear underconstruction for vehicles, which is an improvement over the Tandem axle assembly shown in my copending application, Serial No. 155,256, filed July 23, 1937, which matured into a patent on June 11, 1940, under Patent Number 2,204,087. In this copending case, I set forth tandem axles that are rotatably carried by two sets of springs, the inner ends of each set of springs being slidably supported by a frame that in turn is pivotally connected to the chassis. The free ends of the springs are slidably supported by brackets carried by the chassis. Each axle is rigidly secured to a combined radius rod and torque arm, which has its free end pivotally connected to the chassis with freedom of swinging movement permitting the axle to move toward and away from the chassis and further permitting either axle end to move toward and away from the chassis independently of the other end.

In the present device, I do not use a combined radius rod and torque arm, but rather employ a torque arm rigidly connected to the center of the axle and separate radius rods pivotally connected to each end of the axle and also pivotally attached to the chassis. One form of the invention makes use of a torque arm only for the rear axle, the front axle being rigidly secured to its supporting springs rather than rotatably connected thereto.

In another form of the present invention, each axle has a floating connection with its supporting springs and a separate torque arm is rigidly fastened to each axle and pivotally connected to the chassis. In a still further form, I illustrate the outer ends of the springs as being pivotally connected to the end brackets and the inner ends slidably connected to a central lever. It is possible to use this form with either a single torque arm for only the rear axle, or two torque arms, one for each axle.

Other objects and advantages will appear as the specification proceeds, and the novel features will be particularly set forth in the appended claim.

My invention is illustrated in the accompanying drawings, forming part of this application, in which:

Figure 1 is a plan view of the device connected to the rear end of a vehicle;

Figure 2 is a longitudinal section taken along the line II—II of Figure 1;

Figure 3 is a transverse section taken along the line III—III of Figure 2;

Figure 4 is a section along the line IV—IV of Figure 2;

Figure 5 is an isometric view of the torque arm block;

Figure 6 is a longitudinal section through a modified form of the invention; and Figure 7 is a side elevation of still another modified form of the invention.

While I have shown only the preferred form of my invention, it should be understood that various changes or modifications may be made within the scope of the annexed claim without departing from the spirit of the invention.

In carrying out my invention I will first describe the form of the device using a single torque arm; then the form using a torque arm for each axle; and finally the form wherein the outer ends of the springs are pivotally connected to the chassis brackets, this form making use of either one torque arm connected to one axle or two torque arms connected to two axles.

Figures 1 to 5, inclusive, set forth a chassis A with a front end bracket B, a central bracket C, and a rear bracket D. Both the front and rear brackets B and D have curved saddles 1 and 2, respectively. The central bracket C pivotally carries a lever E at 3 and this lever has curved saddles or bearing plates 4 and 5 at its free ends. It should be noted at this point that both sides of the chassis carry identical brackets and levers. Therefore, a description of one will suffice for both.

A leaf spring F is mounted between the front bracket B and the lever E and a similar leaf spring G is mounted between the lever E and the rear bracket D. There are two leaf springs F, one being mounted on each side of the chassis. The spring F has one end 6 slidably contacting with the curved saddle or bearing plate 1 in the front bracket B and its other end 7 slidably contacting with the curved saddle 4 in the lever E. The bracket B has a bolt 8 and the spring F has a leaf with a hook-shaped portion 9 adjacent to the end 6 for preventing the entire withdrawal of the spring from the bracket. In a like manner, the end 7 of the spring F has a hook 10 for engaging with a bolt 11 carried by the lever E should this end of the spring tend to pull free of the lever.

The central portion of the spring F has U-bolts 12 for rigidly securing an axle H to the spring.

The axle H is held against rotation with respect to the spring F by the U-bolts 12. The spring F is free to flex and the ends 6 and 7 will move relative to the saddles 1 and 4. The spring will have its effective length foreshortened as the axle moves toward the chassis.

The spring G is similarly secured to the lever E and the rear end bracket D. The spring has a hook-shaped portion 13 and a like portion 14 designed to engage with bolts 15 and 16, respectively, carried by the lever and bracket D should the spring ends 17 and 18 have any tendency to pull free from the saddles 5 and 2, respectively. It will be noted from Figure 2 that the spring G has a floating connection with a rear axle J. A bearing 19 rotates freely on the axle J and is secured to the middle of the spring G by bolts 20.

In order to hold the rear axle J from rotating, I provide a torque arm K. This arm has a bifurcated end straddling the rear axle at its center and rigidly secured thereto by bolts and plates indicated generally at 21 in Figures 1 and 2. In lighter constructions, the torque arm K may consist of a single bar or rod rigidly secured to the axle rather than a bifurcated bar. The forward end of the torque arm K is slidably and rotatably received in a bearing block L of the shape shown in Figure 5.

The block L has a bore 22 for receiving the cylindrical end of the torque arm. Trunnions 23 project from the sides of the block and are rotatably received in openings 24 provided in a torque arm support M.

Figures 3 and 4 illustrate the torque arm support M as comprising two angle-shaped members 25 and 26 secured to a transverse member 27 which in turn is connected to the chassis. The members 25 and 26 are inclined toward each other for the greater part of their length and are bent so as to extend parallel to each other. The side portions 25a and 26a act as side bearing surfaces for the block L and the trunnions 23 extend through openings 24 in these portions and also into bearing lugs 28 formed integral with the side portions. Bolts 29 secure the side portions 25a and 26a together and spacing sleeves 30 are mounted on the bolts and maintain the side portions the proper distance apart.

The front and rear axles H and J have their ends held against horizontal movement with respect to the chassis by radius rods. The axle H has radius rods N pivoted thereto at 31 and the rods extend forwardly and are pivoted to the front brackets B by the bolts 8. The axle J has radius rods O pivoted thereto at 32 and the rods extend rearwardly and are pivoted to the rear brackets D by the bolts 16. The radius rods permit the vertical movement of the axles while preventing horizontal movement relative to the chassis A.

From the foregoing description of the various parts of the first form of my invention, the operation thereof may be readily understood. The chassis A may form a part of a truck or a trailer. Brake drums P are mounted on the front axle H and brake drums R are mounted on the rear axle J. In Figure 2 I show wheels S supporting the front axle and wheels T supporting the rear axle.

When the wheels S strike an obstruction and force the axle H upwardly, the springs F transmit the shock to the lever E and thence to the springs G, thus causing these springs to carry part of the shock. The reverse is true when the wheels T strike an obstruction.

The application of brakes to the wheels S and T will cause the springs F to take the braking torque applied against the axle H while the torque arm K and support M will transmit the torque applied against the axle J directly to the chassis A rather than to the springs G. The torque arm K will permit the free vertical movement of the axle J toward and away from the chassis and will also permit either end of the axle to move vertically with respect to the other end. The radius rods O hold the axle J from horizontal movement relative to the chassis during this movement.

The form of the device set forth in Figure 6 is similar to the form already described with the addition that the front axle H' has a full floating connection with the springs F' in the same manner as the axle J' is rotatably connected to the springs G'. The front axle H' has a torque arm similar to the rear torque arm K' and therefore parts similar to the first form described will be given like letters and reference numerals, except that they will be primed. Further description need not be given.

The operation of this form of the device is the same as that described in the first form. The springs F', however, in this form do not receive the braking torque, but instead the front torque arm K' transmits the force directly to the chassis. The springs F' and G' are free to slide in their supports. Radius rods N' and O' hold the axles H' and J' from horizontal movement relative to the chassis while permitting vertical movement with respect thereto. The two torque arms K' allow the free vertical movement of the axles and also either end of each axle to move vertically with respect to the other end.

The form of the invention depicted in Figure 7 can be a modification of either of the first two forms already mentioned. It will be noted that the springs F" and G" have their outer ends pivoted to the brackets B" and D" at 33 and 34 rather than slidably contacting therewith. The inner ends of the springs do slidably contact with the lever E". The radius rods are eliminated and the direct pivotal connection of the springs with the brackets holds the axles (not shown in Figure 7) from horizontal movement relative to the chassis.

Torque arm supporting members M" are also illustrated in Figure 7 and these carry torque arms (not shown) that are rigidly connected to the front and rear axles. The forward torque arm supporting member M" may be dispensed with and the front axle rigidly connected to the spring F" as in Figure 1. The operation of this form is the same as that of the others. The only change is that the springs take the place of the radius rods.

I claim:

In a device of the type described, a chassis, an axle, springs rotatably connected to the axle ends, brackets slidably receiving the spring ends, radius rods connected to the axle ends and to the chassis for holding the axle ends from shifting in opposite directions in a horizontal plane, a Y-shaped torque arm rigidly secured to the axle with the Y-portion receiving the axle, the free end of the arm being cylindrical, a block having a cylindrical bore for slidably and rotatably receiving the cylindrical torque arm end, trunnions carried by the block and extending at right angles to the bore, and a torque arm support for rotatably carrying the block trunnions.

MILTON J. KONETSKY.